(12) United States Patent
Burckhardt et al.

(10) Patent No.: US 10,428,252 B2
(45) Date of Patent: Oct. 1, 2019

(54) TWO-COMPONENT COMPOSITION

(71) Applicant: SIKA TECHNOLOGY AG, Baar (CH)

(72) Inventors: Urs Burckhardt, Zurich (CH); Steffen Kelch, Oberengstringen (CH); Ursula Stadelmann, Zurich (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 15/511,340

(22) PCT Filed: Sep. 25, 2015

(86) PCT No.: PCT/EP2015/072126
§ 371 (c)(1),
(2) Date: Mar. 15, 2017

(87) PCT Pub. No.: WO2016/050646
PCT Pub. Date: Apr. 7, 2016

(65) Prior Publication Data
US 2017/0292050 A1 Oct. 12, 2017

(30) Foreign Application Priority Data
Oct. 1, 2014 (EP) .................................... 14187372

(51) Int. Cl.
| | | |
|---|---|---|
| C09J 175/08 | (2006.01) | |
| C09J 163/00 | (2006.01) | |
| C08L 63/00 | (2006.01) | |
| C08L 71/02 | (2006.01) | |
| C09J 183/12 | (2006.01) | |
| C08G 18/48 | (2006.01) | |
| C08G 18/71 | (2006.01) | |
| C08G 18/75 | (2006.01) | |
| C09D 175/08 | (2006.01) | |
| C08L 75/08 | (2006.01) | |
| C08K 5/5415 | (2006.01) | |
| C08K 5/548 | (2006.01) | |
| C08G 77/458 | (2006.01) | |
| C08G 77/46 | (2006.01) | |

(52) U.S. Cl.
CPC ........ *C09J 175/08* (2013.01); *C08G 18/4866* (2013.01); *C08G 18/718* (2013.01); *C08G 18/755* (2013.01); *C08K 5/548* (2013.01); *C08K 5/5415* (2013.01); *C08L 63/00* (2013.01); *C08L 71/02* (2013.01); *C08L 75/08* (2013.01); *C09D 175/08* (2013.01); *C09J 163/00* (2013.01); *C09J 183/12* (2013.01); *C08G 77/458* (2013.01); *C08G 77/46* (2013.01); *C08G 2190/00* (2013.01); *C08L 2205/03* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,436,359 | A * | 4/1969 | Hubin | C08G 18/10 525/410 |
| 6,066,384 | A * | 5/2000 | Crandall | C08G 65/336 2/244 |
| 6,306,998 | B1 * | 10/2001 | Kimura | C08K 5/07 528/12 |
| 9,822,279 | B2 * | 11/2017 | Burckhardt | C08L 101/00 |
| 2002/0016411 | A1 * | 2/2002 | Ando | C08G 59/18 525/100 |
| 2008/0200607 | A1 * | 8/2008 | Ando | C08L 43/04 524/588 |
| 2013/0012669 | A1 * | 1/2013 | Lin | C08K 5/5435 525/523 |
| 2014/0275446 | A1 * | 9/2014 | Kramer | C08G 59/182 525/523 |

FOREIGN PATENT DOCUMENTS

| | | | |
|---|---|---|---|
| EP | 0 186 191 A2 | 7/1986 | |
| EP | 0370464 A2 | 5/1990 | |
| EP | 2562223 A1 | 2/2013 | |
| WO | WO 2013/068507 | * | 5/2013 |

OTHER PUBLICATIONS

Huntsman Epoxy Formulations Using Jeffamine Polyetheramines (2005).*
Oct. 19, 2015 International Search Report issued in Patent Application No. PCT/EP2015/072126.
Dec. 19, 2018 Office Action issued in Australian Patent Application No. 2015327095.
Mar. 29, 2019 Office Action issued in Australian Patent Application No. 2015327095.

* cited by examiner

Primary Examiner — Marc S Zimmer
(74) Attorney, Agent, or Firm — Oliff PLC

(57) ABSTRACT

A two-component composition, containing at least one silane-group-containing polymer that is liquid at room temperature, at least one epoxide liquid resin, at least one polyetheramine, and at least one aminosilane or mercaptosilane. The composition has low odor, cures quickly and without blistering at room temperature, and, when cured, forms a tough elastic material of high strength, high adhesive force, and good thermal resistance that has no tendency toward yellowing or substrate discoloration. The composition is excellently suitable as a tough elastic adhesive for structural adhesive joints in the field of construction and in industrial production.

17 Claims, No Drawings

TWO-COMPONENT COMPOSITION

TECHNICAL FIELD

The invention relates to two-component compositions which are curable at room temperature and are based on a combination of silane group-containing polymer and epoxy resin, and also to the use thereof, more particularly as a tough elastic adhesive.

PRIOR ART

Known adhesives for structural bonds include two-component polyurethane systems. These systems cure rapidly to form a tough elastic material of high strength, but in some cases contain harmful isocyanates and may form blisters on curing.

Likewise known are two-component epoxy resin adhesives. These adhesives attain very high strengths but are not tough and elastic, instead being brittle and barely stretchable, and hence unsuitable for numerous applications within structural adhesive bonding.

Also known are curable materials based on silane-functional polymers. These materials are mostly one-component formulation s which crosslink at room temperature by reaction of atmospheric moisture. They are notable for blister-free curing and for high adhesion forces, but cure relatively slowly and are very limited in terms of maximum attainable strength. Oftentimes they also have low tear resistance, being therefore decidedly brittle. Furthermore, they are relatively unstable thermally. Hence they are poorly suited to use as tough elastic adhesive.

Also known are curable materials based on a combination of silane-functional polymers with epoxy resins, from EP 0 186 191 and EP 0 370 464, for example. Such materials are in two-component form, and attain greater strength and toughness than those based on silane-functional polymers alone, but are still capable of improvement in this regard. The known systems, moreover, generally include a Mannich base such as, in particular, 2,4,6-tris(dimethylaminomethyl) phenol, which accelerates the reaction of epoxy groups. However, the Mannich base gives the materials a pronounced, unpleasant amine odor and means that the materials undergo yellowing over time. Because the Mannich base is not incorporated into the polymer in the course of curing, furthermore, unwanted migration effects and instances of substrate discoloration may occur.

SUMMARY OF THE INVENTION

It is an object of the present invention to provide a curable material which is low in odor, which cures rapidly at room temperature without blistering, to form a tough elastic material of high strength, high adhesive force, and good thermal stability, with a tendency neither to yellow nor to exhibit substrate discoloration or migration effects.

This object is achieved, surprisingly, by means of a composition as described in claim 1. The composition is notable for a low odor, long storage properties, and effective processing at room temperature. It cures rapidly even without heating, without blistering, to produce a tough elastic material of surprisingly high strength and high thermal stability. Of particular surprise is the fact that in spite of its very high strength, the composition exhibits high stretchability. Surprisingly, furthermore, the composition, on curing at room temperature, attains virtually the ultimate mechanical values which are obtained after additional heating to 80° C. Also very advantageous is the low level of heat produced by the freshly mixed composition, unlike pure epoxy resin systems, which may heat up very strongly after the components have been mixed. Equipped with these properties, the composition is outstandingly suitable as a tough elastic adhesive for structural bonds in the construction sector and in industrial manufacture. Surprisingly, the polyetheramine permits much higher strengths than other customary prior-art amines such as, for example, trimethyl-hexamethylenediamine or isophoronediamine or diethylenetriamine or amine-epoxy adducts.

Further aspects of the invention are subjects of further independent claims. Particularly preferred embodiments of the invention are subjects of the dependent claims.

CERTAIN EMBODIMENTS OF THE INVENTION

The invention provides a composition comprising a first component and a second component, comprising
  at least one silane group-containing polymer, liquid at room temperature,
  at least one liquid epoxy resin,
  at least one polyetheramine, and
  at least one amino- or mercaptosilane,
  the polyetheramine and the amino- or mercaptosilane not being present in the same component as the liquid epoxy resin.

In the present document the term "alkoxysilane group" or "silane group" for short identifies a silyl group which is bonded to an organic radical and which has one to three, more particularly two or three, hydrolyzable alkoxy radicals on the silicon atom.

Correspondingly, the term "alkoxysilane" or "silane" for short identifies an organic compound which has at least one silane group.

"Aminosilane", "mercaptosilane", "hydroxysilane" or "isocyanatosilane" identifies organosilanes which on the organic radical, in addition to the silane group, have one or more amino, mercapto, hydroxyl or isocyanate groups, respectively.

The term "silane group-containing polyether" also embraces silane group-containing polymers which in addition to polyether units may also contain urethane groups, urea groups or thiourethane groups. Silane group-containing polyethers of this kind are also identified as "silane group-containing polyurethanes".

Substance names beginning with "poly" such as polyol or polyisocyanate identify substances which formally contain two or more per molecule of the functional groups that occur in their name.

A "primary amino group" is an $NH_2$ group which is bonded to an organic radical, and a "secondary amino group" is an NH group which is bonded to two organic radicals, which may also together be part of a ring.

"Amine hydrogen" identifies the hydrogen atoms of primary and secondary amino groups.

"Molecular weight" is understood in the present document to be the molar mass (in grams per mole) of a molecule or of a part of a molecule, also referred to as a "radical". "Average molecular weight" is the numerical average $M_n$ of an oligomeric or polymeric mixture of molecules or radicals, and is determined customarily by means of gel permeation chromatography (GPC) against polystyrene as a standard.

"Storage-stable" or "storable" is an adjective applied to a substance or composition which can be kept at room temperature in a suitable container for a relatively long time, typically at least 3 months up to 6 months or more, without any change in its application or service properties as a result of the storage, to any extent relevant for its usage.

A dashed line in the formulae in this document represents in each case the bond between a substituent and the associated remainder of the molecule. "Room temperature" refers to a temperature of 23° C.

The term "high strength" relates to a high modulus of elasticity and possibly also to a high tensile strength.

The term "tough elastic" describes materials which exhibit a combination of high strength, good stretchability, and high impact toughness.

The two-component composition comprises at least one silane group-containing polymer which is liquid at room temperature.

This is preferably a silane group-containing organic polymer, more particularly a polyolefin, poly(meth)acrylate or polyether, or a mixed form of these polymers, which carries in each case one or, preferably, two or more silane group(s). The silane groups may be lateral in the chain or terminal.

In particular, the silane group-containing polymer is a silane group-containing polyether. It preferably has a majority of oxyalkylene units, more particularly 1,2-oxypropylene units.

The silane group-containing polymer has on average preferably 1.3 to 4, more particularly 1.5 to 3, very preferably 1.7 to 2.8, silane groups per molecule. The silane groups are preferably terminal.

Preferred silane groups are trimethoxysilane groups, dimethoxymethylsilane groups or triethoxysilane groups.

The silane group-containing polymer preferably has an average molecular weight, determined by means of GPC relative to polystyrene standard, in the range from 1000 to 30 000 g/mol, more particularly from 2000 to 20 000 g/mol.

The silane group-containing polymer preferably comprises end groups of formula (II),

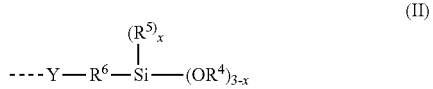

(II)

where x has a value of 0 or 1 or 2, preferably 0 or 1, more particularly 0, $R^4$ is a linear or branched, monovalent hydrocarbon radical having 1 to 5 C atoms, $R^5$ is a linear or branched, monovalent hydrocarbon radical having 1 to 8 C atoms, more particularly methyl or ethyl, $R^6$ is a linear or branched, divalent hydrocarbon radical having 1 to 12 C atoms, which optionally has cyclic and/or aromatic fractions and optionally has one or more heteroatoms, more particularly one or more nitrogen atoms, Y is a divalent radical selected from —O—, —S—, —N($R^7$)—, —N($R^7$)—CO—, —O—CO—N($R^7$)—, —N($R^7$)—CO—O—, and —N($R^7$)—CO—N($R^7$)—, where $R^7$ is a hydrogen atom or is a linear or branched hydrocarbon radical having 1 to 20 C atoms, which optionally has cyclic fractions, and which optionally has an alkoxysilyl, ether or carboxylic ester group.

Preferably $R^4$ is methyl or is ethyl or is isopropyl.

More preferably $R^4$ is methyl. Silane group-containing polymers of this kind are particularly reactive.

With further particular preference. $R^4$ is ethyl. Silane group-containing polymers of this kind are particularly storage-stable and toxicologically advantageous.

$R^5$ is preferably methyl.

$R^6$ is preferably 1,3-propylene or 1,4-butylene, it being possible for butylene to be substituted by one or two methyl groups.

More preferably $R^6$ is 1,3-propylene.

Processes for preparing silane group-containing polyethers are known to the person skilled in the art.

In one process, silane group-containing polyethers are obtainable from the reaction of allyl group-containing polyethers with hydrosilanes, optionally with chain extension using diisocyanates, for example.

In another process, silane group-containing polyethers are obtainable from the copolymerization of alkylene oxides and epoxy silanes, optionally with chain extension using diisocyanates, for example.

In another process, silane group-containing polyethers are obtainable from the reaction of polyether polyols with isocyanatosilanes, optionally with chain extension using diisocyanates.

In a further process, silane group-containing polyethers are obtainable from the reaction of isocyanate group-containing polyethers, more particularly NCO-terminated urethane polyethers from the reaction of polyether polyols with a superstoichiometric amount of polyisocyanates, with aminosilanes, hydroxysilanes or mercaptosilanes. Silane group-containing polyethers from this process are particularly preferred. This process allows the use of a multiplicity of readily commercially available, inexpensive starting materials, making it possible to obtain different polymer properties, such as, for example, high stretchability, high strength, low glass transition temperature or high hydrolytic stability.

Preferred silane group-containing polyethers are obtainable from the reaction of NCO-terminated urethane polyethers with aminosilanes or hydroxysilanes. NCO-terminated urethane polyethers suitable for this purpose are obtainable from the reaction of polyether polyols, more particularly polyoxyalkylene dials or polyoxyalkylene triols, preferably polyoxypropylene dials or polyoxypropylene triols, with a superstoichiometric amount of polyisocyanates, more particularly diisocyanates.

The reaction between the polyisocyanate and the polyether polyol is carried out preferably in the absence of moisture at a temperature from 50° C. to 160° C., optionally in the presence of suitable catalysts, the amount of polyisocyanate being such that its isocyanate groups are in a stoichiometric excess in relation to the hydroxyl groups of the polyol. The excess of polyisocyanate is selected more particularly such that in the resulting urethane polyether, after the reaction of all the hydroxyl groups, the remaining free isocyanate group content is from 0.1 to 5 weight %, preferably 0.2 to 4 weight %, more preferably 0.3 to 3 weight %, based on the overall polymer.

Preferred diisocyanates are selected from the group consisting of 1,6-hexamethylene diisocyanate (HDI), 1-isocyanato-3,3,5-trimethyl-5-isocyanatomethylcyclohexane isophorone diisocyanate or IPDI), 2,4- and 2,6-tolylene diisocyanate and any desired mixtures of these isomers (TDI), and 4,4'-, 2,4'-, and 2,2'-diphenylmethane diisocyanate and any desired mixtures of these isomers (MDI). Particularly preferred are IPDI or TDI. Most preferred is IPDI. Accordingly, silane group-containing polyethers having particularly good light fastness are obtained.

Especially suitable as polyether polyols are polyoxyalkylene diols or polyoxyalkylene triols having a degree of unsaturation less than 0.02 meq/g, more particularly lower than 0.01 meq/g, and having an average molecular weight in the range from 400 to 25 000 g/mol, more particularly 1000 to 20 000 g/mol.

As well as polyether polyols it is also possible proportionally to use other polyols, more particularly polyacrylate polyols, and also low molecular mass diols or trials.

Suitable aminosilanes for the reaction with an NCO-terminated urethane polyether are primary and secondary aminosilanes. Preferred are 3-aminopropyltrimethoxysilane, 3-aminopropyldimethoxymethylsilane, 4-aminobutyltrimethoxysilane, 4-amino-3-methylbutyltrimethoxysilane, 4-amino-3,3-dimethylbutyltrimethoxysilane, N-butyl-3-aminopropyltrimethoxysilane, N-phenyl-3-aminopropyltrimethoxysilane, adducts of primary aminosilanes such as 3-aminopropyltrimethoxysilane, 3-aminopropyldimethoxymethylsilane or N-(2-aminoethyl)-3-aminopropyltrimethoxysilane and Michael acceptors such as acrylonitrile, (meth)acrylic esters, (meth)acrylamides, maleic or fumaric diesters, citraconic diesters or itaconic diesters, more particularly dimethyl or diethyl N-(3-trimethoxysilylpropyl)aminosuccinate. Likewise suitable are analogs of the stated aminosilanes having ethoxy or isopropoxy groups in place of the methoxy groups on the silicon.

Suitable hydroxysilanes for the reaction with an NCO-terminated urethane polyether are obtainable in particular from the addition reaction of aminosilanes with lactones or with cyclic carbonates or with lactides.

Preferred hydroxysilanes of this kind are N-(3-triethoxysilylpropyl)-2-hydroxypropaneamide, N-(3-trimethoxysilylpropyl)-2-hydroxypropaneamide, N-(3-triethoxysilylpropyl)-4-hydroxypentaneamide, N-(3-triethoxysilylpropyl)-4-hydroxyoctaneamide, N-(3-triethoxysilylpropyl)-5-hydroxydecaneamide or N-(3-triethoxysilylpropyl)-2-hydroxypropylcarbamate.

Other suitable hydroxysilanes are obtainable from the addition reaction of aminosilanes with epoxides or from the addition reaction of amines with epoxysilanes.

Preferred hydroxysilanes of this kind are 2-morpholino-4(5)-(2-trimethoxysilyl-ethyl)cyclohexan-1-ol, 2-morpholino-4(5)-(2-triethoxysilylethyl)cyclohexan-1-ol or 1-morpholino-3-(3-(triethoxysilyl)propoxy)propan-2-ol.

Other suitable silane group-containing polyethers include commercially available products, especially the following: MS Polymer™ (from Kaneka Corp.; especially grades S203H, S303H, S227, S810, MA903, and S943); MS Palymer™ and Silyl™ (from Kaneka Corp.; especially grades SAT010, SAT030, SAT200, SAX350, SAX400, SAX725, MAX450, MAX951); Excestar® (from Asahi Glass Co. Ltd.; especially grades S2410, S2420, S3430, S3630); SPUR+* (from Momentive Performance Materials; especially grades 1010LM, 1015LM, 1050MM); Vorasil™ (from Dow Chemical Co.; especially grades 602 and 604); Desmoseal® (from Bayer MaterialScience AG; especially grades S XP 2458, S XP 2636, S XP 2749, S XP 2774, and S XP 2821), TEGOPAC® (from Evonik Industries AG; especially grades Seal 100, Bond 150, Bond 250), Polymer ST (from Manse Chemie AG/Evonik Industries AG, especially grades 47, 48, 61, 61LV, 77, 80, 81); Geniosil® STP (from Wacker Chemie AG; especially grades E10, E15, E30, E35).

The composition preferably has a silane group-containing polymer content in the range from 5 to 60 weight %, more preferably in the range from 10 to 50 weight %, more particularly in the range from 15 to 40 weight %. A composition of this kind exhibits high strength in conjunction with good stretchability and tough elastic properties.

The two-component composition further comprises at least one liquid epoxy resin.

Suitable liquid epoxy resin comprises customary technical epoxy resins which are fluid at room temperature and have a glass transition temperature of below 25° C. They are obtained conventionally, more particularly from the glycidylization of compounds having at least two active hydrogen atoms, more particularly polyphenols, polyols or amines, by reaction with epichlorohydrin.

Suitability as liquid epoxy resin is possessed by aliphatic or cycloaliphatic epoxy resins, more particularly glycidyl ethers of saturated or unsaturated, branched or unbranched, cyclic or open-chain di-, tri- or tetrafunctional $C_2$ to $C_{30}$ alcohols, more particularly ethylene glycol, propylene glycol, butylene glycol, hexanediol, octanediol, polypropylene glycols, dimethylolcyclohexane, neopentyl glycol, dibromoneopentyl glycol, castor oil, trimethylolpropane, trimethylolethane, pentaerythritol, sorbitol or glycerol, or alkoxylated glycerol or alkoxylated trimethylolpropane;

glycidyl ethers of hydrogenated bisphenol A, F or A/F, or ring-hydrogenated liquid bisphenol A, F or A/F resins;

N-glycidyl derivatives of hydantoins, amides or heterocyclic nitrogen bases, such as, in particular, triglycidyl cyanurate or triglycidyl isocyanurate.

Preferred as liquid epoxy resin are aromatic epoxy resins, more particularly glycidyl ethers of polyphenols, more particularly of resorcinol, hydroquinone, pyrocatechol, 2,2-bis(4-hydroxyphenyl)propane (bisphenol A), bis(hydroxyphenyl)methane (bisphenol F), bisphenol A/F, bis(4-hydroxy-3-methyl-phenyl)methane, 2,2-bis(4-hydroxy-3-methylphenyl)propane (bisphenol C), bis(3,5-dimethyl-4-hydroxyphenyl)methane, 2,2-bis(3,5-dimethyl-4-hydroxyphenyl)propane, 2,2-bis(3,5-dibromo-4-hydroxyphenyl)propane, 2,2-bis(4-hydroxy-3-tert-butylphenyl)propane, 2,2-bis(4-hydroxyphenyl)butane (bisphenol B), 3,3-bis(4-hydroxyphenyl)pentane, 3,4-bis(4-hydroxyphenyl)hexane, 4,4-bis(4-hydroxyphenyl)heptane, 2,4-bis(4-hydroxyphenyl)-2-methylbutane, 2,4-bis(3,5-dimethyl-4-hydroxyphenyl)-2-methylbutane, 1,1-bis(4-hydroxyphenyl)cyclohexane (bisphenol Z)) 1,1-bis(4-hydroxyphenyl)-3,3,5-trimethylcyclohexane (bisphenol TMC), 1,1-bis(4-hydroxyphenyl)-1-phenylethane, 1,4-bis[2-(4-hydroxyphenyl)-2-propyl]benzene (bisphenol P), 1,3-bis[2-(4-hydroxyphenyl)-2-propyl]benzene (bisphenol M), 4,4'-dihydroxybiphenyl (DOD), 4,4'-dihydroxybenzophenone, bis(2-hydroxynaphth-1-yl)methane, bis(4-hydroxynaphth-1-yl)methane, 1,5-dihydroxynaphthalene, tris(4-hydroxyphenyl)methane, 1,1,2,2-tetrakis(4-hydroxyphenyl)ethane, bis(4-hydroxyphenyl) ether or bis(4-hydroxyphenyl) sulfone;

glycidyl ethers of condensation products of phenols with aldehydes, obtained under acidic conditions, more particularly glycidyl ethers of phenol-formaldehyde novolacs or cresol-formaldehyde novolacs;

glycidylization products of aromatic amines, more particularly of aniline, toluidine, 4-aminophenol, 4,4'-methylenediphenyldiamine, 4,4'-methylenediphenyldi(N-methyl)amine, 4,4'-[1,4-phenylenebis(1- methylethylidene)]bisaniline (bisaniline P) or 4,4'-[1,
3-phenylenebis(1-methylethylidene)]bisaniline
(bisaniline M).

Particularly preferred as liquid epoxy resin are diglycidyl ethers of bisphenol A or bisphenol F or bisphenol A/F, as are available commercially, for example, from Dow, Huntsman or Momentive. These liquid epoxy resins have readily manageable viscosity and allow high strengths and resistance properties.

The composition preferably has a liquid epoxy resin content in the range from 30 to 70 weight %, more preferably in the range from 35 to 65 weight %.

A composition of this kind exhibits high strength in conjunction with good stretchability and tough elastic properties. Particularly surprising here is the circumstance that such materials display good stretchability even in combination with very high strengths.

The two-component composition further comprises at least one polyetheramine.

Suitable polyetheamines are polyoxyalkylenes or polyoxyalkylated compounds having terminal amino groups, of the kind available commercially, for example, under the tradenames Jeffamine® (from Huntsman), Polyetheramine (from BASF) or PC Amine® (from Nitroil), more particularly the following:

polyetherdiamines having terminal 2-aminopropyl or 2-aminobutyl groups, more particularly Jeffamine® D-230, Jeffamine® D-400 or Jeffamine® D-2000, Jeffamine® D-4000, Jeffamine® XTJ-582, Jeffamine® XTJ-578, Jeffamine® HK-511, Jeffamine® ED-600, Jeffamine® ED-900, Jeffamine® ED-2003, Jeffamine® XTJ-568, Jeffamine® XTJ-569, Jeffamine® THF-100, Jeffamine® THF-140, Jeffamine® THF-230, Jeffamine® XTJ-533 or Jeffamine® XTJ-536 (all from Huntsman).

Polyetherdiamines having terminal 4-aminobutyl groups from the amination of poly(tetramethylene ether) glycols, more particularly Jeffamine® THF-170 (from Huntsman).

Polyetherdiamines from the polyalkoxylation of dials, more particularly propoxylated 1,4-dimethylolcyclohexane such as Jeffamine® RFD-270 (from Huntsman).

Polyetherdiamines, more particularly Jeffamine® T-403, Jeffamine® T-3000, Jeffamine® T-5000 or Jeffamine® XTJ-566 (all from Huntsman), Polyetheramines having secondary amino groups, more particularly Jeffamine® SD-231, Jeffamine® SD-401, Jeffamine® SD-2001 or Jeffamine® ST-404 (all from Huntsman).

Aminopropylated polyetheramines, as obtainable by reaction of polyetheramines with acrylonitrile and subsequent hydrogenation.

The polyetheramine preferably has an average molecular weight in the range from 200 to 500 g/mol.

Particularly preferred polyetheramines are polyetherdiamines or -triamines having primary amino groups and having an average molecular weight in the range from 200 to 500 g/mol, more particularly Jeffamine® D-230, Jeffamine® D-400 Jeffamine® XTJ-582, Jeffamine® HK-511, Jeffamine® XTJ-568, Jeffamine® T-403 or Jeffamine® XTJ-566 (all from Huntsman), or corresponding grades from BASF or from Nitroil.

Most preferred are Jeffamine® D-230 or Jeffamine® D-400 or Jeffamine® T-403 (all from Huntsman), or corresponding grades from BASF or from Nitroil. Particularly high strengths are obtained with the preferred polyetheramines.

The composition preferably has a polyetheramine content in the range from 5 to 30 weight %, more preferably in the range from 10 to 30 weight %.

A composition of this kind exhibits high strength in conjunction with good stretchability and tough elastic properties.

The two-component composition further comprises at least one amino- or mercaptosilane.

The amino- or mercaptosilane is more particularly an alkoxysilane, which may also be present in hydrolyzed or partly hydrolyzed form and/or in oligomeric form, thus being able to comprise condensed fractions.

Suitable amino- or mercaptosilane in one embodiment is a secondary aminosilane, more particularly N-butyl-3-aminopropyltrimethoxysilane, N-phenyl-3-aminopropyltrimethoxysilane, or an adduct of primary aminosilanes such as 3-aminopropyltrimethoxysilane, 3-aminopropyldimethoxymethylsilane or N-(2-aminoethyl)-3-aminopropyltrimethoxysilane with Michael acceptors such as acrylonitrile, (meth)acrylic esters, (meth)acrylamides, maleic or fumaric diesters, citraconic diesters or itaconic diesters, more particularly dimethyl or diethyl N-(3-trimethoxysilylpropyl)aminosuccinate. Likewise suitable are analogs of the stated aminosilanes having ethoxy groups instead of the methoxy groups on the silicon.

A preferred amino- or mercaptosilane is a silane of the formula (I),

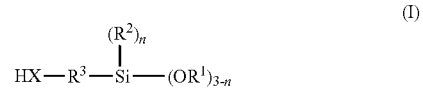

where
X is S or NH,
$R^1$ is a monovalent linear or branched hydrocarbon radical having 1 to 5 C atoms,
$R^2$ is a monovalent linear or branched hydrocarbon radical having 1 to 8 C atoms,
$R^3$ is a divalent linear or branched hydrocarbon radical having 1 to 12 C atoms, which optionally contains cyclic and/or aromatic fractions and optionally one or more heteroatoms, and
n is 0 or 1 or 2.

Preferably X is NH. These silanes permit particularly low-odor compositions. Preferably n is 0 or 1, more particularly 0. These silanes are particularly reactive.

Preferably $R^1$ is methyl or is ethyl or is isopropyl.

More preferably $R^1$ is methyl. These silanes are particularly reactive.

With further particular preference, $R^1$ is ethyl. On reaction with water, these silanes eliminate ethanol, which is relatively benign from an environmental and toxicological standpoint.

Preferably $R^2$ is methyl.

Preferably $R^3$ is a divalent linear or branched hydrocarbon radical having 1 to 6 C atoms, which optionally has a nitrogen atom.

More preferably $R^3$ is a radical selected from 1,3-propylene, 2-methyl-1,3-propylene, 1,4-butylene, 2,2-dimethyl-2,4-butylene, and 3-aza-1,6-hexylene. These radicals are numbered starting from the group HX.

The amino- or mercaptosilane is preferably selected from the group consisting of 3-aminopropyltrimethoxysilane, N-(2-aminoethyl)-3-aminopropyltrimethoxysilane, 3-amino-2-methylpropyltrimethoxysilane, 4-aminobutyltrimethoxysilane, 4-amino-3,3-dimethylbutyltrimethoxysilane, 3-aminopropyldimethoxymethylsilane, and N-(2-aminoethyl)-3-aminopropyldimethoxymethylsilane, or their analogs having ethoxy groups instead of the methoxy groups on the silicon.

Particularly preferred among these are 3-aminopropyltrimethoxysilane, 3-aminopropyltriethoxysilane, N-(2-aminoethyl)-3-aminopropyltrimethoxysilane or N-(2-aminoethyl)-3-aminopropyltriethoxysilane.

The composition preferably has an amino- or mercaptosilane content in the range from 1 to 10 weight %, more preferably in the range from 1.5 to 8 weight %, more particularly in the range from 2 to 6 weight %, most preferably in the range from 3 to 5 weight %.

A composition of this kind has particularly high strength in conjunction with good stretchability and tough elastic properties. Particularly surprising here is the circumstance that with the preferred high levels of amino- or mercaptosilane—higher than is customary in the prior art—the resulting materials have very high strengths, without significant detractions being observed in stretchability by comparison with materials having lower levels of amino- or mercaptosilane.

The silane group-containing polymer and the amino- or mercaptosilane preferably have the same alkoxy radicals on the silane group. As a result, on the curing of the composition, only one kind of alcohol is released. Preferably, therefore, $R^1$ and $R^4$ are identical radicals, more particularly methyl radicals or ethyl radicals.

In the composition, the weight ratio between the liquid epoxy resin and the silane group-containing polymer is preferably at least 1. A composition of this kind has, in the cured state, very high tensile strength, a high modulus of elasticity, and good stretchability, and is therefore particularly suitable as an adhesive having tough elastic properties.

The weight ratio between the liquid epoxy resin and the silane group-containing polymer is preferably in the range from 1.2 to 10, more preferably 1.3 to 9, more particularly 1.4 to 5.

The composition preferably has a relative amino- or mercaptosilane content of at least 2 weight %, based on the sum total of the silane group-containing polymer and the liquid epoxy resin.

With particular preference it has a relative amino- or mercaptosilane content, based on the sum total of the silane group-containing polymer and the liquid epoxy resin, in the range from 2 to 10 weight %, preferably 2.5 to 8 weight %, more particularly 3 to 7 weight %. In the cured state, a composition of this kind possesses very high strengths and pronounced tough elastic properties.

Especially preferred is a composition which has
(i) a weight ratio between the liquid epoxy resin and the silane group-containing polymer in the range from 1.2 to 10, more particularly 1.3 to 9, more particularly 1.4 to 5, and
(ii) a relative amino- or mercaptosilane content in the range from 2 to 10 weight %, preferably 2.5 to 8, more particularly 3 to 7 weight %, based on the sum total of the silane group-containing polymer and the liquid epoxy resin.

Especially preferred, furthermore, is a composition having
(i) a room-temperature-liquid, silane group-containing polymer content in the 5 to 60 weight % range, preferably in the range from 10 to 50 weight %, more particularly in the range from 15 to 40 weight %,
(ii) a liquid epoxy resin content in the range from 30 to 70 weight %, preferably in the range from 35 to 65 weight %,
(iii) an amount of polyetheramine having an average molecular weight in the range from 200 to 500 g/mol in the range from 5 to 30 weight %, preferably in the range from 10 to 30 weight %, and
(iv) an amino- or mercaptosilane content in the range from 1 to 10 weight %, preferably in the range from 1.5 to 8 weight %, more preferably in the range from 2 to 6 weight %, more particularly in the range from 3 to 5 weight %.

With compositions of this kind it is possible to achieve tough elastic materials having very high strengths. In particular, materials are obtainable that have a modulus of elasticity in the range from 0.05 to 0.25% elongation of approximately 400 MPa to about 1000 MPa, with an elongation at break in the range from approximately 8 to 15%.

In the composition, the polyetheramine and the amino- or mercaptosilane are not present in the same component as the liquid epoxy resin.

In one embodiment of the invention, the composition comprises a first component comprising
at least one silane group-containing polymer and
at least one liquid epoxy resin,
and a second component comprising
at least one polyetheramine and
at least one amino- or mercaptosilane.

The advantage of such a composition is that the first component is particularly storage-stable.

In another embodiment, the composition comprises a first component comprising
at least one silane group-containing polymer,
at least one polyetheramine, and
at least one amino- or mercaptosilane,
and a second component comprising
at least one liquid epoxy resin.

The advantage of such a composition is that the ease with which the two components can be mixed is particularly good.

In the case of both embodiments, the components on their own are stable on storage in the absence of moisture. When the two components are mixed, primary and/or secondary amino groups and/or mercapto groups react with epoxide groups that are present. Silane groups react and, in so doing, release alcohol when they come into contact with water.

In one preferred embodiment of the invention, the composition comprises water or a water-releasing substance. A composition of this kind is especially suitable for applications where the uptake of water from the air or from the substrates to which the composition is applied is low. Such applications include, in particular, use as an adhesive between diffusion-tight materials such as metals, plastics, fiber-reinforced composite materials, glass, or ceramic, in which the adhesive has virtually no air contact.

The ratio between the water present in or released in the composition and the water required for complete hydrolysis and crosslinking of the silane groups is preferably at least 0.5, more preferably at least 1, and not more than 5, more preferably not more than 2.5.

The composition may preferably contain in total up to 1 weight % of free water. The water may be present in free form or bound physically or chemically to a carrier material. Suitable carrier materials for water are porous materials which enclose water within voids, particularly kieselguhr or molecular sieves. Other suitable carrier materials are those which take up water in nonstoichiometric amounts and have a pastelike consistency or form gels, examples being silica gels, clays, polysaccharides or polyacrylic acids, which are also known as "superabsorbents" and are employed, for example, in the manufacture of hygiene articles. Carrier materials suitable additionally are polymers in which water can be emulsified in such a way as to form a stable emulsion.

Suitable water-releasing substance comprises hydrates or aqua complexes, especially inorganic compounds which contain water in coordinately bonded form or as water of crystallization, more particularly $Na_2SO_4.10H_2O$, $CaSO_4.2H_2O$, $CaSO_4.1/2H_2O$, $Na_2B_4O_7.10H_2O$, $MgSO_4.7H_2O$, the hexaaqua complexes of iron(II), iron(III), cobalt(II), cobalt(III) or nickel(II), $[(H_2O)_4Co(NH_3)_2]^{3+}$ or $[Cl(H_2O)_3Co(NH_3)_2]^{2+}$.

Additionally suitable as water-releasing substance are compounds which release water on heating, particularly at a temperature in the range from 50 to 150° C., especially 70 to 130° C., such as boric acid, aluminum hydroxides, or silicas, for example. Especially suitable is boric acid. This compound is preferably in finely dispersed form. It has in particular an average particle diameter in the range from 0.01 to 100 µm, preferably 0.1 to 50 µm, more particularly 0.3 to 30 µm.

Additionally suitable as water-releasing substance are compounds which are able to undergo condensation with primary amines and release water in so doing. Suitable compounds condensable with primary amines are, in particular:

ketones, especially acetone, methyl ethyl ketone, methyl isobutyl ketone, methyl amyl ketone, methyl isoamyl ketone, cyclohexanone;

diketones, especially 1,3-diketones, particularly 2,4-pentanedione or 3,5-heptanedione, or 1,4-diketones, particularly 2,5-hexanedione;

aldehydes, particularly propanal, 2-methylpropanal, butanal, 2-methylbutanal, 2-ethylbutanal, pentanal, pivalaldehyde, 2-methylpentanal, 3-methylpentanal, 4-methylpentanal, 2,3-dimethylpentanal, hexanal, 2-ethylhexanal, heptanal, octanal, nonanal, decanal, undecanal, 2-methylundecanal, do-decanal, methoxyacetaldehyde, cyclopropanecarbaldehyde, cyclopentanecarbaldehyde, cyclohexanecarbaldehyde, 2,2-dimethyl-3-phenylpropanal, 1-naphthaldehyde, benzaldehyde, salicylaldehyde, 2-methylbenzaldehyde, 3-methylbenzaldehyde, 4-methylbenzaldehyde, 4-methoxybenzaldehyde, 4-dimethylaminobenzaldehyde, 2,2-dimethyl-3-(N,N-bis(methoxyethyl))aminopropanal, 2,2-dimethyl-3-(N-morpholino)propanal, 2,2-dimethyl-3-(N-(2,6-dimethyl)morpholino)propanal, 2,2-dimethyl-3-acetoxypropanal, 2,2-dimethyl-3-isobutyroxypropanal, or 2,2-dimethyl-3-lauroyloxypropanal.

In one particularly preferred embodiment of the invention, the composition comprises at least one water-releasing substance which is a compound condensable with primary amines. This compound is preferably not present in the same component as the polyetheramine and the amino- or mercaptosilane. When the components are mixed, the compound that is condensable with primary amines is able to react with primary amines that are present, with water being produced very rapidly and in ultrafine distribution within the composition and therefore being able to form particularly efficient crosslinking of the silane groups present.

The quantity of primary amino groups in such a composition is preferably such that after the components have been mixed, a sufficient number thereof remain over to convert, together with the secondary amino groups and/or mercapto groups optionally present, the epoxide groups that are present in the composition.

A composition of this kind preferably comprises at least one silane of the formula (I) in which X is NH.

The composition may comprise further constituents in addition to those stated.

The composition preferably comprises a catalyst which accelerates the crosslinking of silane group-containing polymers. Especially suitable for that purpose are metal catalysts and/or nitrogen-containing compounds.

Suitable metal catalysts are compounds of titanium, zirconium, aluminum, or tin, especially organotin compounds, organotitanates, organozirconates, or organoaluminates, these metal catalysts containing, in particular, alkoxy groups, aminoalkoxy groups, sulfonate groups, carboxyl groups, 1,3-diketonate groups, 1,3-ketoesterate groups, dialkyl phosphate groups, or dialkyl pyrophosphate groups.

Particularly suitable organotin compounds are dialkyltin oxides, dialkyltin dichlorides, dialkyltin dicarboxylates, or dialkyltin diketonates, especially dibutyltin oxide, dibutyltin dichloride, dibutyltin diacetate, dibutyltin dilaurate, dibutyltin diacetylacetonate, dioctyltin oxide, dioctyltin dichloride, dioctyltin diacetate, dioctyltin dilaurate, or dioctyltin diacetylacetonate, and also alkyltin thioesters.

Particularly suitable organotitanates are bis(ethylacetoacetato)diisobutoxy-titanium(IV), bis(ethylacetoacetato)diisopropoxytitanium(IV), bis(acetylacetonato)diisopropoxytitanium(IV), bis(acetylacetonato)diisobutoxy-titanium(IV), tris(oxyethyl)amineisopropoxytitanium(IV), bis[tris(oxyethyl)amine]-diisopropoxytitanium(IV), bis(2-ethylhexane-1,3-dioxy)titanium(IV), tris[2-((2-aminoethyl)amino)ethoxy]ethoxytitanium(IV), bis(neopentyl(diallyl)oxydiethoxy-titanium(IV), titanium(IV) tetrabutanoxide, tetra(2-ethylhexyloxy)titanate, tetra-(isopropoxy)titanate, or polybutyltitanate. Especially suitable are the commercially available products Tyzor® AA, GBA, GBO, AA-75, AA-65, AA-105, DC, BEAT, BTP, TE, TnBT, KTM, TOT, TRT or IBAY (all from Dorf Ketal); Tytan PBT, TET, X85, TAA, ET, S2, S4 or S6 (all from Borica Company Ltd.) or Ken-React® KR® TTS, 7, 9QS, 12, 26S, 33DS, 38S, 39DS, 44, 134S, 138S, 133DS, 158FS or LICA® 44 (all from Kenrich Petrochemicals).

Particularly suitable organozirconates are the commercially available products Ken-React® NZ® 38J, KZ® TPPJ, KZ® TPP, NZ® 01, 09, 12 38, 44 or 97 (all from Kenrich Petrochemicals) or Snapcure® 3020, 3030, 1020 (all from John-son Matthey & Brandenberger).

A particularly suitable organoaluminate is the commercially available product K-Kat 5218 (from King Industries).

Nitrogen-containing compounds with catalyst suitability are, in particular, amines such as, in particular, N-ethyldiisopropylamine, N,N,N',N'-tetramethyl-alkylenediamines, polyoxyalkyleneamines, 1,4-diazabicyclo[2.2.2]octane; aminosilanes such as, in particular, 3-aminopropyltrimethoxysilane, 3-aminopropyldimethoxymethylsilane, N-(2-aminoethyl)-3-aminopropyltrimethoxysilane, N-(2-aminoethyl)-3-aminopropylmethyldimethoxysilane, N-(2-aminoethyl)-N'-[3-(trimethoxysilyl)propyl]ethylenediamine and also analogs thereof with ethoxy groups or isopropoxy groups instead of the methoxy groups on the silicon; amidines such as, in particular, 1,8-diazabicyclo[5.4.0]undec-7-ene (DBU), 1,5-diazabicyclo[4.3.0]non-5-ene (DBN), 6-dibutylamino-1,8-diazabicyclo[5.4.0]undec-7-ene; guanidines such as, in particular, tetramethylguanidine, 2-guanidinobenzimidazole, acetylacetoneguanidine, 1,3-di-o-tolylguanidine, 2-tert-butyl-1,1,3,3-tetramethylguanidine, or reaction products of carbodiimides and amines such as, in particular, polyetheramines or aminosilanes; or imidazoles such as, in particular, N-(3-trimethoxysilylpropyl)-4,5-dihydroimidazole or N-(3-triethoxysilylpropyl)-4,5-dihydroimidazole.

Also especially suitable are combinations of different catalysts, especially combinations of at least one metal catalyst and at least one nitrogen-containing compound.

Preferred as catalyst are organotin compounds, organotitanates, amines, amidines, guanidines, or imidazoles.

The composition may further comprise other substances that are reactive toward epoxide groups, more particularly the following:

monoamines such as hexylamine or benzylamine, or polyethermonoamines, especially alcohol-started products such as Jeffamine® M-600, Jeffamine® M-1000, Jeffamine® M-2005, Jeffamine® M-2070, Jeffamine® XTJ-581, Jeffamine® XTJ-249 or Jeffamine® XTJ-435, or alkylphenol-started products such as Jeffamine® XTJ-436 (all from Huntsman);

aliphatic, cycloaliphatic or arylaliphatic primary diamines, especially 2,2-dimethyl-1,3-propanediamine, 1,3-pentanediamine (DAMP), 1,5-pentanediamine, 1,5-diamino-2-methylpentane (MPMD), 2-butyl-2-ethyl-1,5-pentanediamine (C11 neodiamine), 1,6-hexanediamine, 2,5-dimethyl-1,6-hexanediamine, 2,2 (4),4-trimethylhexamethylenediamine (TMD), 1,7-heptanediamine, 1,8-octanediamine, 1,9-nonanediamine, 1,10-decanediamine, 1,11-undecanediamine, 1,12-dodecanediamine, 1,2-, 1,3- or 1,4-diaminocyclohexane, bis(4-aminocyclohexyl) methane ($H_{12}$-MDA), bis(4-amino-3-methylcyclohexyl)methane, bis(4-amino-3-ethylcyclohexyl)methane, bis(4-amino-3,5-dimethylcyclohexyl)methane, bis(4-amino-3-ethyl-5-methylcyclohexyl)methane, 1-amino-3-aminomethyl-3,5,5-trimethylcyclohexane (isophoronediamine or IPDA), 2- or 4-methyl-1,3-diaminocyclohexane or mixtures thereof, 1,3-bis(aminomethyl)cyclohexane, 1,4-bis(aminomethyl)cyclohexane, 2,5(2,6)-bis(amino-methyl)bicyclo[2.2.1]heptane (NBDA), 3(4),8(9)-bis(aminomethyl)tricyclo-[5.2.1.0$^{2,6}$]decane, 1,4-diamino-2,2,6-trimethylcyclohexane (TMCDA), 1,8-menthanediamine, 3,9-bis(3-aminopropyl)-2,4,8,10-tetraoxaspiro[5.5]undecane, 1,3-bis(aminomethyl) benzene (MXDA) or 1,4-bis(aminomethyl)benzene;

aliphatic, cycloaliphatic or arylaliphatic primary triamines, especially 1,3,5-tris(aminomethyl)benzene, 1,3,5-tris(aminomethyl)cyclohexane, tris(2-aminoethyl)amine, tris(2-aminopropyl)amine or tris(3-aminopropyl)amine;

ether group-containing aliphatic primary di- or triamines, especially bis(2-aminoethyl) ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine or 4,7,10-trioxatridecane-1,13-diamine;

polyamines having secondary amino groups and having two primary aliphatic amino groups, especially 3-(2-aminoethyl)aminopropylamine, bis-(hexamethylene) triamine (BHMT), diethylenetriamine (DETA), triethylenetetramine (TETA), tetraethylenepentamine (TEPA), pentaethylenehexamine (PEHA), or higher homologs of linear polyethyleneamines such as polyethylenepolyamine having 5 to 7 ethyleneamine units (known as "higher ethylenepolyamine", HEPA), products from the multiple cyanoethylation or cyanobutylation and subsequent hydrogenation of primary di- and polyamines having at least two primary amino groups, such as dipropylenetriamine (DPTA), N-(2-aminoethyl)-1,3-propanediamine (N3 amine), N,N'-bis(3-aminopropyl)ethylenediamine (N4 amine), N,N'-bis(3-aminopropyl)-1,4-diaminobutane, N5-(3-aminopropyl)-2-methyl-1,5-pentanediamine, N3-(3-aminopentyl)-1,3-pentanediamine, N5-(3-amino-1-ethylpropyl)-2-methyl-1,5-pentanediamine or N,N'-bis (3-amino-1-ethylpropyl)-2-methyl-1,5-pentanediamine;

polyamines having one or two secondary amino groups, especially N-butyl-1,2-ethanediamine, N-hexyl-1,2-ethanediamine, N-(2-ethylhexyl)-1,2-ethanediamine, N-cyclohexyl-1,2-ethanediamine, 4-aminomethylpiperidine, N-(2-aminoethyl)piperazine, N-methyl-1,3-propanediamine, N-butyl-1,3-propanediamine, N-(2-ethylhexyl)-1,3-propanediamine, N-cyclohexyl-1,3-propanediamine, 3-methylamino-1-pentylamine, 3-ethylamino-1-pentylamine, 3-cyclohexylamino-1-pentylamine, fatty diamines such as N-cocoalkyl-1,3-propanediamine, products from the Michael-like addition reaction of primary aliphatic diamines with acrylonitrile, maleic or fumaric diesters, citraconic diesters, acrylic or methacrylic esters, acrylamides or methacrylamides or itaconic diesters, reacted in a 1:1 molar ratio, products from the reductive alkylation of primary aliphatic polyamines with aldehydes or ketones, especially N-benzyl-1,3-bis(aminomethyl) benzene, N,N'-dibenzyl-1,3-bis(aminomethyl)benzene, N-2-ethylhexyl-1,3-bis(aminomethyl)benzene, N,N'-bis(2-ethylhexyl)-1,3-bis(aminomethyl)benzene, $N^1$-benzyl-1,2-propanediamine, $N^1$-(4-methoxybenzyl)-1,2-propanediamine, $N^1$-(4-(dimethylamino)benzyl)-1,2-propanediamine, or partially styrenized polyamines such as, for example, styrenized MXDA (available as Gaskamine® 240 from Mitsubishi Gas Chemical);

polyamines having tertiary amino groups and having primary aliphatic amino groups, such as, in particular, 3-(N,N-dimethylamino)propylamine (DMAPA), 3-(N, N-diethylamino)propylamine (DEAPA), 2-(N,N-diethylamino)ethylamine, 1-(N,N-diethylamino)-4-aminopentane, N,N-dimethyldi(1,3-propylene)triamine (DMAPAPA), N,N'-bis(aminopropyl)piperazine, N,N-bis(3-aminopropyl)methylamine, N,N-bis(3-aminopropyl)ethylamine, N,N-bis(3-aminopropyl)propylamine, N,N-bis(3-aminopropyl)cyclohexylamine, N,N-bis(3-aminopropyl)-2-ethylhexylamine, products from the dual cyanoethylation and subsequent reduction of fatty amines derived from natural fatty acids, such as N,N-bis(3-aminopropyl)dodecylamine or N,N-bis(3-aminopropyl)tallowalkylamine, available as Triameen® Y12D or Triameen® YT (from Akzo Nobel); tris(2-aminoethyl)amine, tris(2-aminopropyl)amine, tris(3-aminopropyl)amine or 4-aminomethyl-1,8-octanediamine;

aromatic polyamines, such as, in particular, m- and p-phenylenediamine, 4,4'-, 2,4'- and/or 2,2'-diaminodiphenylmethane, 3,3'-dichloro-4,4'-diaminodiphenylmethane (MOCA), 2,4- and/or 2,6-tolylenediamine, mixtures of 3,5-dimethylthio-2,4- and -2,6-tolylenediamine (available as Ethacure® 300 from Albermarle), mixtures of 3,5-diethyl-2,4- and -2,6-tolylenediamine (DETDA), 3,3',5,5'-tetraethyl-4,4'-diaminodiphenylmethane (M-DEA), 3,3',5,5'-tetraethyl-2,2'-dichloro-4, 4'-diaminodiphenylmethane (M-CDEA), 3,3'-diisopropyl-5,5)-dimethyl-4,4'-diaminodiphenylmethane (M-MIPA), 3,3',5,5'-tetraisopropyl-4,4'-diaminodiphenylmethane (M-DIPA), 4,4'-diaminodiphenyl sulfone (DDS), 4-amino-N-(4-aminophenyl)benzenesulfonamide, 5,5'-methylenedianthranilic acid, dimethyl 5,5'-methylenedianthranilate, 1,3-propylenebis(4-aminobenzoate), 1,4-butylenebis(4-aminobenzoate), polytetramethylene oxide bis(4-aminobenzoate) (available as Versalink® from Air Products), 1,2-bis(2-aminophenylthio)ethane, 2-methylpropyl 4-chloro-3,5-diaminobenzoate or tert-butyl 4-chloro-3,5-diaminobenzoate;

adducts of the stated polyamines with epoxides or epoxy resins, especially adducts with diepoxides in a molar ratio of approximately 2/1, adducts with monoepoxides in a molar ratio of approximately 1/1, or reaction products of amines and epichlorohydrin, particularly that of 1,3-bis(amino-methyl)benzene, available commercially as Gaskamine® 328 (from Mitsubishi Gas Chemical);

polyamidoamines, especially reaction products of a mono- or polybasic carboxylic acid, and/or the esters or anhydrides thereof, especially of a dimer fatty acid, with an aliphatic, cycloaliphatic or aromatic polyamine employed in stoichiometric excess, more particularly with a polyalkylenamine such as, for example, DETA or TETA, more particularly the commercially available polyamidoamines Versamid® 100, 125, 140 or 150 (from Cognis), Aradur® 223, 250 or 848 (from Huntsman), Euretek® 3607 or 530 (from Huntsman), or Beckopox® EH 651, EH 654, EH 655, EH 661 or EH 663 (from Cytec);

Mannich bases obtained from the reaction of phenols with aldehydes, especially formaldehyde, and aliphatic or cycloaliphatic amines, especially phenalkamines, i.e., Mannich bases of cardanol (long-chain alk(en)ylphenols and -resorcinols obtained by thermal treatment of cashew shell oil extracts, containing as principal component 3-(pentadeca-8,11,14-trienyl)phenol), more particularly the commercial products Cardolite® NC-541, NC-557, NC-558, NC-566, Lite 2001 or Lite 2002 (from Cardolite), Aradur® 3440, 3441, 3442 or 3460 (from Huntsman), or Beckopox® EH 614, EH 621, EH 624, EH 628 or EH 629 (from Cytec);

liquid, mercaptan-terminated polysulfide polymers, known under the brand name Thiokol® (from Morton Thiokol; available, for example, from SPI Supplies, or from Toray Fine Chemicals), especially the products LP-3, LP-33, LP-980, LP-23, LP-55, LP-56, LP-12, LP-31, LP-32 or LP-2; and also, moreover, known under the brand name Thioplast® (from Akzo Nobel), particularly the products G 10, G 112, G 131, G 1, G 12, G 21, G 22, G 44 or G 4;

polyethers having terminal mercapto groups, especially products from the reaction of polyether polyols with epichlorohydrin and subsequent replacement of the chloride groups with mercapto groups, as for example by means of sodium hydrosulfide, more particularly the commercial products Capcure® 3-800 or GPM 800 (from Gabriel Performance Products);

polyesters of thiocarboxylic acids, or esterification products of polyoxyalkylene diols or triols, ethoxylated trimethylolpropane or polyester diols, with thiocarboxylic acids such as thioglycolic acid or 2- or 3-mercaptopropionic acid; or other compounds containing mercapto groups, such as, in particular, 2,4,6-trimercapto-1,3,5-triazine, 2,2'-(ethylenedioxy)diethanethiol (triethylene glycol dimercaptan) or ethanedithiol.

Besides the polyetheramine and the amino- or mercaptosilane, the composition preferably contains only a small fraction of other substances reactive toward epoxide groups. With preference not more than 50%, more preferably not more than 25%, more particularly not more than 10% of all groups reactive toward epoxide groups in the composition do not come from the polyetheramine or from the amino- or mercaptosilane.

Further suitable constituents of the composition are, in particular, the following auxiliaries and additives:

adhesion promoters and/or crosslinkers, especially aminosilanes with secondary amino groups such as, in particular, N-phenyl-, N-cyclohexyl- or N-alkylaminosilanes, epoxysilanes such as, in particular, 3-glycidyloxy-propyltrimethoxysilane, (meth)acrylosilanes, anhydridosilanes, carbamatosilanes, alkylsilanes or iminosilanes, or oligomeric forms of these silanes, or adducts of primary aminosilanes with epoxysilanes or (meth)acrylosilanes or anhydridosilanes.

Plasticizers, especially carboxylic esters such as phthalates, more particularly dioctyl phthalate, diisononyl phthalate or diisodecyl phthalate, adipates, more particularly dioctyl adipate, azelates, sebacates, polyols, more particularly polyoxyalkylene polyols or polyester polyols, glycol ethers, glycol esters, organic phosphoric and sulfonic acid esters, polybutenes, or fatty acid methyl or ethyl esters derived from natural fats or oils and also called "biodiesel".

Solvents or diluents, especially xylene, methoxypropyl acetate, dibutyl ether, diethers of ethylene glycol or diethylene glycol or propylene glycol or dipropylene glycol, octane, diphenylmethane, diisopropylnaphthalene, petroleum fractions such as, for example, Solvesso® products (from Exxon), N-methylpyrrolidone or higher N-alkylpyrrolidones, or ethoxylated or propoxylated phenol.

Reactive diluents for epoxy resins, especially cresyl glycidyl ether, benzylglycidyl ether, tert-butylphenyl glycidyl ether, nonylphenyl glycidyl ether, 2-ethylhexyl glycidyl ether, glycidyl ethers of natural alcohols such as, in particular, $C_8$ to $C_{10}$ alkyl glycidyl ethers or $C_{12}$ to $O_{14}$ alkyl glycidyl ethers, or glycidyl ethers of diols or polyols such as polypropylene glycols, dimethylolcyclohexane, glycerol, neopentyl glycol or trimethylolpropane.

Other epoxy resins, especially solid bisphenol A, F or A/F resins, bisphenol F novolacs, glycidyl ethers of polypropylene glycols or hydrogenated liquid bisphenol A, F or A/F resin.

Polymers, especially polyamides, polysulfides, polyvinylformal (PVF), polyvinylbutyral (PVB), polyurethanes (PU), polymers having carboxyl groups, polyamides, butadiene-acrylonitrile copolymers, styrene-acrylonitrile copolymers, butadiene-styrene copolymers, homo- or copolymers of unsaturated monomers, more particularly from the group encompassing ethylene, propylene, butylene, isobutylene, isoprene, vinyl acetate or alkyl (meth)acrylates, especially chlorosulfonated polyethylenes or fluorine-containing polymers, sulfonamide-modified melamines, or purified montan waxes;

inorganic and organic fillers, especially ground or precipitated calcium carbonates, optionally coated with fatty acids, more particularly with stearic acid, or barytes (heavy spar), talcs, finely ground quartzes, silica sand, micas such as, in particular, potassium mica, dolomites, wollastonites, kaolins, calcined kaolins, molecular sieves, aluminum oxides, aluminum hydroxides, magnesium hydroxide, silicas, including finely divided silicas from pyrolysis processes, cements, gypsums, flyashes, carbon black, graphite, metal powders such as aluminum, copper, iron, silver or steel, PVC powders or hollow beads.

Fibers, especially glass fibers, carbon fibers, metal fibers, ceramic fibers or polymeric fibers such as polyimide fibers or polyethylene fibers.

Dyes.

Pigments, especially titanium dioxide or iron oxides.

Accelerators for the reaction of epoxide groups such as, in particular, acids or compounds which can be hydrolyzed to give acids, especially organic carboxylic acids such as acetic acid, benzoic acid, salicylic acid, 2-nitrobenzoic acid, lactic acid, or organic sulfonic acids such as methanesulfonic acid, p-toluenesulfonic acid or 4-dodecylbenzenesulfonic acid, or sulfonic acid esters or other organic or inorganic acids such as, in particular, phosphoric acid, or mixtures of the aforementioned acids and their acid esters; or tertiary amines such as, in particular, 1,4-diazabicyclo[2.2.2]octane, benzyldimethylamine, α-methylbenzyldimethylamine, triethanolamine, dimethylaminopropylamine, imidazoles such as, in particular, N-methylimidazole, N-vinylimidazole or 1,2-dimethylimidazole, salts of such tertiary amines, quaternary ammonium salts such as, in particular, benzyltrimethylammonium chloride, amidines such as, in particular, 1,8-diazabicyclo[5.4.0]undec-7-ene, guanidines such as, in particular, 1,1,3,3-tetramethylguanidine, phenols such as, in particular, tert-butylphenol, nonylphenol, dodecylphenol, cardanol (long-chain alk(en)ylphenols and -resorcinols obtained by thermal treatment of cashew shell oil extracts, containing as principal component 3-(pentadeca-8,11,14-trienyl)phenol, available commercially in particular as Cardolite® NC-700 from Cardolite), styrenized phenol, bisphenols, aromatic hydrocarbon resins containing phenol groups, more particularly the Novares® products LS 500, LX 200, LA 300 or LA 700 (from Rutgers), phenolic resins such as novolacs, or Mannich bases such as, in particular, 2-(dimethylaminomethyl)phenol, 2,4,6-tris(dimethylaminomethyl)phenol, or polymers of phenol, formaldehyde and N,N-dimethyl-1,3-propanediamine, phosphites such as, in particular, diphenyl or triphenyl phosphites, or compounds containing mercapto groups.

Drying agents, especially tetraethoxysilane, vinyltrimethoxy- or vinyl-triethoxysilane or organoalkoxysilanes having a functional group in α-position to the silane group, especially N-(methyldimethoxysilylmethyl)-O-methyl-carbamate, (methacryloyloxymethyl)silanes, methoxymethylsilanes, orthoformic acid esters, and also calcium oxide or molecular sieves.

Rheology modifiers, more particularly thickeners, especially phyllosilicates such as bentonites, derivatives of castor oil, hydrogenated castor oil, polyamides, polyurethanes, urea compounds, polyvinyl chlorides, fumed silicas, cellulose ethers, or hydrophobically modified polyoxyethylenes.

Stabilizers against oxidation, heat, light or UV radiation.

Natural resins, fats or oils such as rosin, shellac, linseed oil, castor oil or soybean oil.

Flame retardants, especially aluminum hydroxide (ATH), magnesium dihydroxide (MDH), antimony trioxide, antimony pentoxide, boric acid (B(OH)$_3$), zinc borate, zinc phosphate, melamine borate, melamine cyanurate, ammonium polyphosphate, melamine phosphate, melamine pyrophosphate, polybrominated diphenyl oxides or diphenyl ethers, phosphates such as, in particular, diphenyl cresyl phosphate, resorcinol bis(diphenyl phosphate), resorcinol diphosphate oligomer, tetraphenylresorcinol diphosphite, ethylenediamine diphosphate or bisphenol A bis(diphenyl phosphate), tris(chloroethyl) phosphate, tris(chloro-propyl) phosphate or tris(dichloroisopropyl) phosphate, tris[3-bromo-2,2-bis-(bromomethyl)propyl] phosphate, tetrabromo bisphenol A, bis(2,3-dibromopropyl ethers) of bisphenol A, brominated epoxy resins, ethylene-bis(tetrabromophthalimide), ethylenebis(dibromonorbornanedicarboximide), 1,2-bis(tribromophenoxy)ethane, tris(2,3-dibromopropyl)isocyanurate, tribromophenol, hexabromocyclododecane, bis(hexachlorocyclopentadieno)cyclooctane, or chlorinated paraffins;

surface-active substances, especially wetting agents, flow control agents, deaerating agents or defoamers.

Biocides, especially algicides, fungicides or fungal growth inhibitors.

It may be advisable to dry certain constituents chemically or physically before mixing them into the composition, particularly if they are to be used as a constituent of the first component.

Such further constituents of the composition may be present as constituents of the first or of the second component. Free water is preferably not in the same component as the silane group-containing polymer and the amino- or mercaptosilane. Further constituents reactive toward epoxide groups are preferably not in the same component as the liquid epoxy resin.

Within the composition, the ratio between the number of groups reactive toward epoxide groups and the number of epoxide groups is preferably in the range from 0.5 to 1.5, more particularly in the range from 0.8 to 1.2.

In one preferred embodiment the composition described is free from 2,4,6-tris(dimethylaminomethyl)phenol. This compound causes an unpleasant odor, yellowing of the composition, and, in some cases, substrate fouling.

The two components of the composition described are produced and stored separately in the absence of moisture. They are typically each stored in a separate container. The separate components are storage-stable, meaning that each component before being used can be kept for several months up to a year or more without suffering any change in its respective properties to any extent relevant for its use. A suitable container for storing the respective component is, in particular, a drum, a hobbock, a pouch, a pail, a canister, a cartridge or a tube.

For the application of the composition described, the two components are mixed with one another shortly before or during the application. The mixing ratio is preferably selected such that the groups reactive toward epoxide groups are present in an appropriate ratio with respect to the epoxide groups, as described above. In parts by weight, the mixing ratio between the two components is customarily in the range from 1:10 to 10:1.

The two components are mixed by means of a suitable method; this may take place continuously or batchwise, via a static mixer or using a dynamic mixer. If mixing takes place prior to application, it should be ensured that application takes place within the pot life of the composition, since otherwise there may be disruptions, such as retarded or incomplete development of adhesion to the substrate, or premature gelling, for example. This "pot life" is the time within which the composition is to be applied after the components have been mixed. Mixing takes place preferably at ambient temperature, which is typically in the range from about 5 to 50° C., preferably about 10 to 30° C.

The mixing of the two components sees the start of curing through chemical reaction. In this reaction, primary and secondary amino groups and mercapto groups react with epoxide groups present, causing ring-opening of the latter. On contact with water, silane groups that are present undergo hydrolysis with release of alcohol, forming silanol groups (Si—OH groups) and, through subsequent condensation reactions, siloxane groups (Si—O—Si groups). As the outcome of these reactions, the composition cures to a crosslinked plastic. If the water for the hydrolysis reaction of the silane groups was not already present in the composition or released therein, it may come from the air (atmospheric moisture) or from a substrate, or the composition may be contacted with a water-containing component, by spreading, spraying or mixing in, for example.

Curing takes place in particular at a temperature in the range from 0 to 150° C. It may take place in particular at ambient temperature, in which case it typically extends over several days to weeks, until it is largely concluded under the prevailing conditions. Alternatively, curing may take place at elevated temperature, more particularly at a temperature in the range from 50 to 130° C.

In that case the composition preferably comprises water or, in particular, a water-releasing substance. In certain cases it may be advantageous for a composition which is partly cured at ambient temperature to be aftercured or cured fully at an elevated temperature.

The curing process of the composition is such, in particular, that on the one hand a sufficient pot life or open time is ensured, for correct application of the composition, and on the other hand that curing has rapidly progressed to a state in which the composition can be worked further or, in particular, that an adhesive bond made using the composition is self-supporting and can be transported.

The invention therefore also provides a cured composition obtained from the composition described in the present document, by mixing of the first component with the second component.

It has emerged that in the course of curing, the time taken for the composition to be tack-free is determined by the crosslinking rate of the silane group-containing polymer. This is an indication that in the cured composition, the cured, silane group-containing polymer typically forms the continuous phase and the cured epoxy resin typically forms the disperse phase, a conclusion supported by Raman microscopy studies. The amino- or mercaptosilane may chemically connect the two phases.

From the examples it is evident that a composition, without addition of fillers, may after curing have an appearance varying from untransparent and white through semitransparent and onto transparent, with semitransparent and transparent compositions having particularly high strengths.

Particularly high strengths are obtained if the liquid epoxy resin and the amino- or mercaptosilane are present in the preferred amounts.

The cured composition has outstanding mechanical properties, very good thermal stability, and good adhesion properties. It is therefore particularly suitable for use as adhesive, sealant, coating or casting material with tough elastic properties. It is especially suitable for use as an adhesive, since the tough elastic properties observed, together with the high thermal stability and the good adhesion properties, are particularly advantageous in particular for stiff-elastic bonds.

The composition is also advantageous especially when reasons of occupational hygiene and health protection dictate the use of isocyanate-free products.

The composition is especially suitable for the bonding, sealing or coating of the following substrates:
  glass, glass-ceramic, screen-printed ceramic, concrete, mortar, brick, tile, gypsum, natural stones such as granite or marble, or glass mineral fiber mats;
  metals or alloys such as aluminum, iron, steel, or nonferrous metals, or surface-enhanced metals or alloys such as galvanized or chromed metals;
  leather, textiles, paper, wood, woodbase materials bound with resins, such as with phenolic, melamine or epoxy resins, resin-textile composite materials, or other so-called polymer composites;
  plastics, especially rigid or flexible PVC, ABS, polycarbonate (PC), polyamide (PA), polyesters, PMMA, epoxy resins, PU, POM, PO, PE, PP, EPM or EPDM, the plastics having been optionally surface-treated by plasma, corona or flaming;
  fiber-reinforced plastics, such as carbon fiber-reinforced plastics (CRP), glass fiber-reinforced plastics (GRP) or sheet molding compounds (SMC);
  coated substrates, such as powder-coated metals or alloys;
  paints or varnishes, especially automobile topcoats.

As and when necessary, the substrates may be pretreated before the composition is applied. Such pretreatments include, in particular, physical and/or chemical cleaning techniques, as for example sanding, sandblasting, shotblasting, brushing and/or blowing, and also, furthermore, treatment with cleaners or solvents, or the application of an adhesion promoter, an adhesion promoter solution or a primer.

The present invention further provides for the use of the above-described composition as adhesive, more particularly for structural bonding in the construction or manufacturing industry, especially as assembly adhesive, bodywork adhesive, sandwich element adhesive, half-shell adhesive for rotor blades of wind turbines, or architectural facing element adhesive.

An adhesive of this kind, before it is used, is kept preferably in a pack which consists of a package having two chambers separate from one another, each chamber containing either the first or the second component of the adhesive. Preferred such packs are side-by-side twin cartridges or coaxial cartridges, where two tubular chambers are arranged alongside one another or inside one another and are given an airtight and moisture-tight seal with pistons. The components can be extruded from the cartridge via the forward movement of these pistons. The sides of the tubes opposite the pistons are modified, optionally via an adapter, in such a way that the chamber openings communicate directly with one another via a dividing wall in the region of the opening. Advantageously there is a thread made in the region of the outlet opening of the chambers, allowing a static mixer or dynamic mixer to be mounted closely. Packs of this kind are preferred in particular for small-scale applications, in particular for volumes of up to 1 liter. For applications in larger amounts, particularly for applications in industrial manufacture, the two components are stored advantageously in drums or hobbocks. In application of the adhesive, the components are extruded via conveying pumps and metered via lines to a mixing apparatus of the kind customarily used for two-component adhesives in industrial manufacture.

Mixing in this case takes place typically via static mixers or by means of dynamic mixers. For a visual monitoring of the quality of mixing, it may be advantageous if the two components have two different colors. Effective mixing in that case is present when the mixed adhesive is colored homogeneously, without exhibiting visible stripes or streaks.

The adhesive is used more particularly in a method for adhesively bonding a first substrate to a second substrate, said method comprising the steps of:
- mixing the above-described first and second components,
- applying the mixed adhesive to at least one of the substrate surfaces to be bonded,
- joining the substrates to be bonded, within the open time,
- curing the adhesive.

The two substrates here may consist of the same or different materials. Particularly suitable substrates are those specified above.

The use of the adhesive results in an article in which the adhesive joins two substrates to one another. The article, accordingly, comprises an at least partly cured composition as described above.

This article is, in particular, a house, a bathroom, a kitchen, a roof, a bridge, a tunnel, a road, a sandwich element of a lightweight structure, a solar panel such as photovoltaic modules or solar heating modules, a glass architectural facing, a window, a pane, a mirror, a trough, a white good, a domestic appliance, a dishwasher, a washing machine, an oven, a wind turbine rotor blade, an automobile, a bus, a truck, a rail vehicle, a ship, an aircraft, a helicopter, or a headlight; or a component part of such an article.

EXAMPLES

Set out below are working examples which are intended to elucidate in more detail the invention described. The invention is of course not confined to these working examples described.

"Standard conditions" refers to 23±1° C. and 50±5% relative atmospheric humidity.

"AHEW" stands for the amine hydrogen equivalent weight.

"EEW" stands for the epoxide equivalent weight.

Silane Group-Containing Polymers Used:

STP Polymer-1:

In the absence of moisture, 1000 g of Acclaim® 12200 polyol (from Bayer; low monol polyoxypropylene diol, OH number 11.0 mg KOH/g, water content about 0.02 wt %), 43.6 g of isophorone diisocyanate (Vestanat® IPDI from Evonik Industries), 126.4 g of diisodecyl phthalate and 0.12 g of dibutyltin dilaurate were heated to 90° C. with continual stirring and left at that temperature until the free isocyanate group content as determined by titrimetry had reached a level of 0.63 wt %. Then 62.3 g of diethyl N-(3-trimethoxysilylpropyl)aminosuccinate were mixed in and the mixture was stirred at 90° C. until FT-IR spectroscopy no longer detected any free isocyanate. The silane-functional polymer was cooled to room temperature and kept in the absence of moisture.

STP Polymer-1 contains 10 weight % of plasticizer (diisodecyl phthalate).

STP Polymer-2:

In the absence of moisture, 600 g of Acclaim® 12200 polyol (from Bayer; low monol polyoxypropylene diol, OH number 11.0 mg KOH/g, water content about 0.02 wt %), 24.9 g of isocyanatopropyltrimethoxysilane and 0.6 g of dibutyltin dilaurate were heated to 80° C. with continual stirring and left at that temperature for 2 hours until no further reaction progress was found by FT-IR spectroscopy. The remaining isocyanate groups were reacted by addition of 2.0 g of methanol at 70° C. for 30 minutes and the mixture was then aftertreated for a further 30 minutes at 80° C. and approximately 2 mbar. The silane-functional polymer was cooled to room temperature and kept in the absence of moisture.

STP Polymer-3:

Geniosil® STP E15 (trimethoxysilylpropylcarbamate-terminated polyether from Wacker Chemie)

Commercial Substances Used and their Abbreviations:

| | |
|---|---|
| EP resin | Bisphenol A diglycidyl ether (Araldite® GY 250 from Huntsman, EEW about 187.5 g/eq) |
| DBTDL 10% | Dibutyltin(IV) dilaurate, 10 weight % in diisodecyl phthalate |
| Silane A-1110 | 3-Aminopropyltrimethoxysilane (Silquest® A-1110 from Momentive, AHEW about 89.7 g) |
| Silane A-1120 | N-(2-Aminoethyl)-3-aminopropyltrimethoxysilane (Silquese® A-1120 from Momentive, AHEW about 74.1 g) |
| Silane A-189 | 3-Mercaptopropyltrimethoxysilane (Silquest® A-189 from Momentive, molecular weight about 196 g) |
| Epoxysilane | 3-Glycidyloxypropyltrimethoxysilane (Silquest® A-187 from Momentive, molecular weight about 236 g) |
| Vinylsilane | Vinyltrimethoxysilane (Silquest® A-171 from Momentive) |
| Jeff. D-230 | Polyetherdiamine, average molecular weight about 230 g/mol, AHEW about 60 g (Jeffamine® D-230 from Huntsman) |
| Jeff. D-400 | Polyetherdiamine, average molecular weight about 430 g/mol, AHEW about 115 g (Jeffamine® D-400 from Huntsman) |
| Jeff. T-403 | Polyethertriamine, average molecular weight about 440 g/mol, AHEW about 81 g (Jeffamine® T-403 from Huntsman) |
| Jeff. D-2000 | Polyetherdiamine, average molecular weight about 2000 g/mol, AHEW about 514 g (Jeffamine® D-2000 from Huntsman) |
| TMD | 2,2,4- and 2,4,4-Trimethylhexamethylenediamine, AHEW 39.6 g/eq (Vestamin® TMD from Evonik Industries) |
| DETA | Diethylenetriamine, AHEW 20.6 g |
| Ancam. K 54 | 2,4,6-Tris(dimethylaminomethyl)phenol (Ancamine® K 54 from Air Products) |
| DBU | 1,8-Diazabicyclo[5.4.0]undec-7-ene |
| Amine adduct | Reaction product of 116 parts by weight of 1,5-diamino-2-methylpentane and 200 parts by weight of Araldite® DY-K (monoglycidyl ether of cresol with EEW about 182 g/eq, from Huntsman), AHEW 109 g |
| Aldehyde-1 | 2,2-Dimethyl-3-(N-morpholino)propanal |
| Aldehyde-2 | 2-Ethylhexanal |
| Aldehyde-3 | 2,2-Dimethyl-3-lauroyloxypropanal |

Production of Two-Component Compositions:

Examples 1 to 36

For each example, the ingredients indicated in tables 1 to 7 were mixed in the indicated quantities (in parts by weight) of component-1 by means of a centrifugal mixer (Speed-Mixer™ DAC 150, FlackTek Inc.) and the mixtures were stored in the absence of moisture.

Similarly, the ingredients of component-2, indicated in tables 1 to 7, were processed and kept.

Subsequently the two components of each composition were processed to a homogeneous liquid using the centrifugal mixer, and this liquid was immediately tested as follows:

To measure the time until freedom from tack, abbreviated as "TFT", a small part of the mixed composition at room temperature was applied in a layer thickness of approximately 3 mm to cardboard and a determination was made of the time under standard conditions until, on gentle contact with the surface of the composition with an LDPE pipette, for the first time no residues remained on the pipette any longer.

The tensile strength, the elongation at break, and the modulus of elasticity at 0.05 to 0.25% elongation (E-modulus 1) and at 0.5 to 5.0% elongation (E-modulus 2) were determined in accordance with DIN EN 53504 (tensioning speed 10 mm/min) on dumbbells with a length of 75 mm, with a bar length of 30 mm and a bar width of 4 mm, which were produced by punching from films with a thickness of around 2 mm, these films being films of the composition cured under the specific conditions indicated. The values identified in the tables as "10 d SC" were determined after a storage time of 10 days under standard conditions. The values identified with "+2 d 80° C." were determined on dumbbells which had been stored under standard conditions for 10 days and subsequently for 2 days in a forced air oven at 80° C. The values denoted as "+7 d 100° C." were determined on dumbbells which had been stored under standard conditions for 10 days and then stored at 100° C. in a forced air oven for 7 days. The values identified as "+7 d 60° C./100% rh" were determined on dumbbells stored under standard conditions for 10 days and subsequently at 60° C. and 100% relative humidity for 7 days.

For the measurement of the tensile shear strength, test specimens were produced by applying the composition for 1 minute in each case after the end of the mixing time, between two H420 steel sheets (steel sheet thickness 1.5 mm) degreased with isopropanol, in a layer thickness of 0.3 mm, on an overlapping bond area of 10×25 mm. The tensile shear strength was determined on these test specimens at room temperature in accordance with DIN EN 1465, the test specimens having been stored prior to measurement for 7 days under standard conditions and then in a forced air oven at 80° C. for 3 hours, followed by cooling to room temperature.

After curing, all of the films were absolutely tack-free, opaquely white to fully transparent, and had a glossy to silk-matt surface. The degree of transparency was assessed optically and identified as "untransparent" or "semitransparent" (abbreviated where appropriate to "semitransp.") or "transparent" and reported as "appearance". Films identified as "inhomogeneous" exhibited areas or stripes differing in transparency.

The results are reported in tables 1 to 7.

The examples identified with "(Ref)" are comparative examples.

"EP/STP" in the tables denotes in each case the weight ratio between the liquid epoxy resin and the silane group-containing polymer (without plasticizer).

"rel. silane content" in the tables identifies in each case the relative amino- or mercaptosilane content, based on the sum total of the silane group-containing polymer and the liquid epoxy resin (without plasticizer), in weight %.

TABLE 1

Composition and properties of examples 1 to 5 and of comparative examples 6 to 8.

| Example | 1 | 2 | 3 | 4 | 5 | 6 (Ref) | 7 (Ref) | 8 (Ref) |
|---|---|---|---|---|---|---|---|---|
| Component-1: | | | | | | | | |
| STP Polymer-1 | 32.8 | 32.8 | 32.8 | 32.8 | 32.8 | 32.8 | 32.8 | 32.8 |
| EP resin | 66.5 | 66.5 | 66.5 | 66.5 | 66.5 | 66.5 | 66.5 | 66.5 |
| DBTDL 10% | 0.7 | 0.7 | 0.7 | 0.7 | 0.7 | 0.7 | 0.7 | 0.7 |
| Component-2: | | | | | | | | |
| Silane A-1120 | 5.0 | 5.0 | 5.0 | 5.0 | 5.0 | 5.0 | 5.0 | 7.5 |
| Jeff. D230 | 20.0 | 20.0 | | | | | | |
| Jeff. D400 | | | 37.0 | | | | | |
| Jeff. T403 | | | | 25.0 | | | | |
| Jeff. D2000 | | | | | 14.0 | | | |
| TMD | | | | | 11.0 | 13.0 | | |
| Amine adduct | | | | | | | 35.0 | |
| Ancam. K 54 | | 2 | | | | | | 10.0 |
| TFT (min.) | 150 | 150 | 110 | 170 | 148 | 122 | 146 | 136 |
| Appearance | semi-transp., colorless | semi-transp., yellowish | transparent, colorless | semi-transp., colorless | untransparent, white | untransparent, white | untransparent, white | untransparent, yellow |
| 10 d SC | | | | | | | | |
| TS [MPa] | 14.0 | 13.8 | 16.0 | 19.6 | 10.3 | 8.1 | 4.9 | 8.3 |
| Elongation at break | 13% | 9% | 45% | 9% | 17% | 14% | 15% | 41% |
| E-Modulus 1 [MPa] | 570 | 555 | 675 | 757 | 223 | 140 | 60 | 81 |
| E-Modulus 2 [MPa] | 228 | 203 | 262 | 340 | 102 | 70 | 45 | 43 |

TABLE 1-continued

Composition and properties of examples 1 to 5 and of comparative examples 6 to 8.

| Example | 1 | 2 | 3 | 4 | 5 | 6 (Ref) | 7 (Ref) | 8 (Ref) |
|---|---|---|---|---|---|---|---|---|
| +2 d 80° | | | | | | | | |
| TS [MPa] | 16.9 | 16.3 | 17.5 | 21.0 | 9.0 | 7.0 | 6.0 | 9.8 |
| Elongation at break | 10% | 8% | 16% | 7.9% | 9% | 8% | 14% | 7% |
| E-Modulus 1 [MPa] | 663 | 610 | 882 | 974 | 249 | 166 | 115 | 234 |
| E-Modulus 2 [MPa] | 284 | 278 | 283 | 343 | 120 | 89 | 74 | 139 |
| EP/STP | 2.3 | 2.3 | 2.3 | 2.3 | 2.3 | 2.3 | 2.3 | 2.3 |
| rel. silane content [%] | 5.2 | 5.2 | 5.2 | 5.2 | 5.2 | 5.2 | 5.2 | 7.8 |

"TS" stands for "tensile strength"

TABLE 2

Composition and properties of comparative example 9 and of examples 10 to 15.

| Example | 9 (Ref) | 10 | 11 | 12 | 13 | 14 | 15 |
|---|---|---|---|---|---|---|---|
| Component-1: | | | | | | | |
| STP Polymer-1 | 32.8 | 32.8 | 32.8 | 32.8 | 32.8 | 32.8 | 32.8 |
| EP resin | 66.5 | 66.5 | 66.5 | 66.5 | 66.5 | 66.5 | 66.5 |
| DBTDL 10% | 0.7 | 0.7 | 0.7 | 0.7 | 0.7 | 0.7 | 0.7 |
| Component-2: | | | | | | | |
| Silane A-1120 | — | 1.0 | 2.5 | 5.0 | 7.5 | 10.0 | — |
| Silane A-189 | — | — | — | — | — | — | — |
| Jeff. D-230 | 24.0 | 23.0 | 22.5 | 20.0 | 18.5 | 17.0 | 21.8 |
| DBU | — | — | — | — | — | — | 0.2 |
| TFT (min.) | 94 | 125 | 135 | 132 | 82 | 62 | 125 |
| Appearance | untransparent | untransparent | semi-transp. | semi-transp. | semi-transp. | transparent | semi-transp. |
| 10 d SC | | | | | | | |
| TS [MPa] | 3.1 | 6.2 | 9.6 | 12.7 | 14.6 | 10.5 | 10.4 |
| Elongation at break | 12% | 22% | 15% | 12% | 13% | 8% | 14% |
| E-Modulus 1 [MPa] | 39 | 73 | 177 | 527 | 633 | 520 | 411 |
| E-Modulus 2 [MPa] | 23 | 52 | 77 | 193 | 254 | 256 | 157 |
| +2 d 80° | | | | | | | |
| TS [MPa] | 4.7 | 6.8 | 9.8 | 15.0 | 15.7 | 14.4 | 12.5 |
| Elongation at break | 11% | 16% | 12% | 8% | 8% | 6% | 10% |
| E-Modulus 1 [MPa] | 47 | 83 | 210 | 615 | 702 | 572 | 493 |
| E-Modulus 2 [MPa] | 30 | 67 | 101 | 230 | 279 | 281 | 188 |
| EP/STP | 2.3 | 2.3 | 2.3 | 2.3 | 2.3 | 2.3 | 2.3 |
| rel. silane content [%] | 0 | 1.0 | 2.6 | 5.2 | 7.8 | 10.4 | 5.2 |

"TS" stands for "tensile strength"

TABLE 3

Composition and properties of examples 1 and 16 to 19 and of comparative examples 20 to 22.

| Example | 16 | 17 | 1 | 18 | 19 | 20 (Ref) | 21 (Ref) | 22 (Ref) |
|---|---|---|---|---|---|---|---|---|
| Component-1: | | | | | | | | |
| STP Polymer-1 | 32.8 | 32.8 | 32.8 | 32.8 | 32.8 | 32.8 | 32.8 | 32.8 |
| EP resin | 66.5 | 66.5 | 66.5 | 66.5 | 66.5 | 66.5 | 66.5 | 66.5 |
| DBTDL 10% | 0.7 | 0.7 | 0.7 | 0.7 | 0.7 | 0.7 | 0.7 | 0.7 |
| Epoxysilane | — | — | — | — | — | — | 5.0 | 7.5 |
| Component-2: | | | | | | | | |
| Silane A-1120 | 1.7 | 3.3 | 5.0 | 7.5 | 10.0 | — | — | — |
| Vinylsilane | — | — | — | — | — | 4.0 | — | — |
| Jeff. D-230 | 22.4 | 21.2 | 20.0 | 18.5 | 17.0 | 20.0 | 24.0 | 24.0 |

TABLE 3-continued

Composition and properties of examples 1 and 16 to 19 and of comparative examples 20 to 22.

| Example | 16 | 17 | 1 | 18 | 19 | 20 (Ref) | 21 (Ref) | 22 (Ref) |
|---|---|---|---|---|---|---|---|---|
| DETA | — | — | — | — | — | 1.0 | — | — |
| TFT (min.) | 240 | 170 | 150 | 146 | 142 | 140 | 165 | 160 |
| Appearance | semi-transp. | semi-transp. | semi-transp. | semi-transp. | semi-transp. | untransparent | untransparent | inhomogeneous |
| 10 d SC | | | | | | | | |
| TS [MPa] | 6.1 | 12.1 | 14.0 | 12.6 | 10.6 | 1.0 | 3.2 | 1.4 |
| Elongation at break | 13% | 14% | 13% | 13% | 11% | 15% | 23% | 10% |
| E-Modulus 1 [MPa] | 102 | 452 | 570 | 438 | 310 | 20 | 27 | 50 |
| E-Modulus 2 [MPa] | 47 | 182 | 228 | 233 | 215 | 8 | 20 | 20 |
| +2 d 80° | | | | | | | | |
| TS [MPa] | 6.6 | 13.9 | 16.9 | 16.4 | 13.8 | 1.2 | 3.3 | 2.2 |
| Elongation at break | 11% | 11% | 10% | 10% | 9% | 8% | 19% | 8% |
| E-Modulus 1 [MPa] | 127 | 516 | 663 | 525 | 403 | 68 | 36 | 90 |
| E-Modulus 2 [MPa] | 65 | 169 | 284 | 280 | 258 | 17 | 26 | 36 |
| EP/STP | 2.3 | 2.3 | 2.3 | 2.3 | 2.3 | 2.3 | 2.3 | 2.3 |
| rel. silane content [%] | 1.8 | 3.4 | 5.2 | 7.8 | 10.4 | — | — | — |

"TS" stands for "tensile strength"

TABLE 4

Composition and properties of examples 1 and 23 to 27.

| Example | 23 | 24 | 25 | 1 | 26 | 27 |
|---|---|---|---|---|---|---|
| Component-1: | | | | | | |
| STP Polymer-1 | 59.6 | 49.7 | 39.7 | 33.1 | 19.9 | 9.9 |
| EP resin | 39.7 | 49.7 | 59.6 | 66.2 | 79.4 | 89.4 |
| DBTDL 10% | 0.7 | 0.7 | 0.7 | 0.7 | 0.7 | 0.7 |
| Component-2: | | | | | | |
| Silane A-1120 | 5.0 | 5.0 | 5.0 | 5.0 | 5.0 | 5.0 |
| Jeff. D-230 | 10.0 | 14.0 | 17.0 | 20.0 | 25.0 | 28.0 |
| TFT (min.) | 121 | 144 | 176 | 150 | 191 | 280 |
| Appearance | semitransparent | semitransparent | semitransparent | semitransparent | inhomogeneous | inhomogeneous |
| 10 d SC | | | | | | |
| TS [MPa] | 5.5 | 7.8 | 10.9 | 14.0 | 26.7 | 36.1 |
| Elongation at break | 66% | 46% | 19% | 13% | 7% | 9% |
| E-Modulus 1 [MPa] | 62 | 151 | 382 | 570 | 1439 | 1903 |
| E-Modulus 2 [MPa] | 38 | 79 | 148 | 228 | 392 | 515 |
| +2 d 80° | | | | | | |
| TS [MPa] | 4.8 | 8.3 | 13.1 | 16.9 | 34.5 | 45.3 |
| Elongation at break | 36% | 25% | 13% | 10% | 8% | 7% |
| E-Modulus 1 [MPa] | 73 | 180 | 432 | 663 | 1392 | 1847 |
| E-Modulus 2 [MPa] | 37 | 85 | 162 | 284 | 611 | 802 |
| EP/STP | 0.74 | 1.1 | 1.7 | 2.2 | 4.4 | 10.0 |
| rel. silane content [%] | 5.3 | 5.3 | 5.2 | 5.2 | 5.1 | 5.0 |

"TS" stands for "tensile strength"

TABLE 5

Composition and properties of examples 1 and 28 to 32.

| Example | 28 | 29 | 30 | 31 | 32 | 1 |
|---|---|---|---|---|---|---|
| Component-1: | | | | | | |
| STP Polymer-1 | 32.8 | 32.8 | 32.8 | 32.8 | 32.8 | 32.8 |
| EP resin | 66.5 | 66.5 | 66.5 | 66.5 | — | 66.5 |
| Silane A-1120 | — | — | — | — | 5.0 | — |
| Jeff. D-230 | — | — | — | — | 20.0 | — |
| DBTDL 10% | 0.7 | 0.7 | 0.7 | 0.7 | 0.7 | 0.7 |
| Aldehyde-1 | 2.0 | — | — | — | — | — |
| Aldehyde-2 | — | 2.0 | — | — | — | — |
| Aldehyde-3 | — | — | 3.3 | — | — | — |
| 2,4-Pentanedione | — | — | — | 2.0 | — | — |
| Component-2: | | | | | | |
| Silane A-1120 | 5.0 | 5.0 | 5.0 | 5.0 | — | 5.0 |
| Jeff. D-230 | 20.0 | 20.0 | 20.0 | 20.0 | — | 20.0 |
| EP resin | — | — | — | — | 66.5 | — |
| Water | — | — | — | — | 0.25 | — |
| TFT (min.) | 140 | 130 | 145 | 135 | 140 | 150 |
| Appearance | transparent | transparent | transparent | semi-transp. | semi-transparent | semi-transparent |
| 10 d SC | | | | | | |
| TS [MPa] | 15.8 | 15.1 | 14.4 | 12.1 | 13.2 | 14.0 |
| Elongation at break | 8% | 10% | 12% | 10% | 10% | 13% |
| E-Modulus 1 [MPa] | 767 | 761 | 820 | 555 | 472 | 570 |
| E-Modulus 2 [MPa] | 247 | 241 | 229 | 146 | 206 | 228 |
| +2 d 80° | | | | | | |
| TS [MPa] | 23 | 23 | 21 | 15 | 19 | 16.9 |
| Elongation at break | 6% | 9% | 9% | 7% | 8% | 10% |
| E-Modulus 1 [MPa] | 768 | 760 | 825 | 448 | 677 | 663 |
| E-Modulus 2 [MPa] | 298 | 285 | 271 | 175 | 247 | 284 |
| EP/STP | 2.3 | 2.3 | 2.3 | 2.3 | 2.3 | 2.3 |
| rel. silane content [%] | 5.2 | 5.2 | 5.2 | 5.2 | 5.2 | 5.2 |

"TS" stands for "tensile strength"

TABLE 6

Composition and properties of exampes 1 and 33 to 34.

| | Example | | |
|---|---|---|---|
| | 1 | 33 | 34 |
| Component-1: | | | |
| STP Polymer-1 | 32.8 | — | — |
| STP Polymer-2 | — | 32.8 | — |
| STP Polymer-3 | — | — | 32.8 |
| EP resin | 66.5 | 66.5 | 66.5 |
| DBTDL 10% | 0.7 | 0.7 | 0.7 |
| Component-2: | | | |
| Silane A-1120 | 5.0 | 5.0 | 5.0 |
| Jeff. D-230 | 20.0 | 20.0 | 20.0 |
| TFT (min.) | 150 | 80 | 90 |
| Appearance | semitransparent | untransparent | untransparent |
| 10 d SC | | | |
| Tensile strength [MPa] | 14.0 | 7.2 | 7.0 |
| Elongation at break | 13% | 14% | 12% |
| E-Modulus 1 [MPa] | 570 | 95 | 153 |
| E-Modulus 2 [MPa] | 228 | 56 | 70 |
| +2 d 80° | | | |
| Tensile strength [MPa] | 16.9 | 6.7 | 8.6 |
| Elongation at break | 10% | 9% | 11% |
| E-Modulus 1 [MPa] | 663 | 138 | 169 |
| E-Modulus 2 [MPa] | 284 | 75 | 88 |
| +7 d 100° C. | | | |
| Tensile strength [MPa] | 11.0 | n.d. | n.d. |
| Elongation at break | 9% | n.d. | n.d. |
| E-Modulus 1 [MPa] | 622 | n.d. | n.d. |
| E-Modulus 2 [MPa] | 184 | n.d. | n.d. |
| +7 d 60° C./100% rh | | | |
| Tensile strength [MPa] | 10.5 | n.d. | n.d. |
| Elongation at break | 9% | n.d. | n.d. |
| E-Modulus 1 [MPa] | 507 | n.d. | n.d. |
| E-Modulus 2 [MPa] | 178 | n.d. | n.d. |
| EP/STP | 2.3 | 2.0 | 2.0 |
| rel. silane content [%] | 5.2 | 5.0 | 5.0 |

"n.d." stands for "not determined"

TABLE 7

Composition and properties of examples 35 to 36.

| | Example | |
|---|---|---|
| | 35 | 36 |
| Component-1: | | |
| STP Polymer-1 | 32.8 | 32.8 |
| EP resin | 66.5 | 66.5 |
| DBTDL 10% | 0.7 | 0.7 |
| Wollastonite | 25.0 | — |
| Precipitated coated chalk[1] | — | 25.0 |
| Component-2: | | |
| Silane A-1120 | 5.0 | 5.0 |
| Jeff. D-230 | 20.0 | 20.0 |
| Tensile shear strength [MPa] | 17.3 | 14.1 |
| 10 d SC | | |
| Tensile strength [MPa] | 20.2 | 14.9 |
| Elongation at break | 5% | 3% |
| E-Modulus 1 [MPa] | 1093 | 1072 |
| +3 h 80° | | |
| Tensile strength [MPa] | 20.0 | 17.1 |
| Elongation at break | 4% | 4% |
| E-Modulus 1 [MPa] | 1200 | 1075 |

[1] Socal® U1S2 from Solvay

The invention claimed is:

1. A composition comprising a first component and a second component, comprising
   at least one silane group-containing polymer, liquid at room temperature,
   at least one liquid epoxy resin, at least one polyetheramine, and at least one amino- or mercaptosilane, the polyetheramine and the amino- or mercaptosilane not being present in the same component as the liquid epoxy resin, and 90% or more of groups reactive with an epoxide group are from the at least one polyetheramine and the at least one amino- or mercaptosilane.

2. The composition as claimed in claim 1, wherein the silane group-containing polymer is a silane group-containing polyether.

3. The composition as claimed in claim 1, wherein it has a silane group-containing polymer content in the range from 5 to 60 weight %.

4. The composition as claimed in claim 1, wherein it has a liquid epoxy resin content in the range from 30 to 70 weight %.

5. The composition as claimed in claim 1, wherein the polyetheramine has a number average molecular weight ($M_n$) in the range from 200 to 500 g/mol.

6. The composition as claimed in claim 1, wherein it has a polyetheramine content in the range from 5 to 30 weight %.

7. The composition as claimed in claim 1, wherein the amino- or mercaptosilane is a silane of the formula (I),

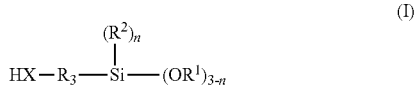

where

X is S or NH, $R^1$ is a monovalent linear or branched hydrocarbon radical having 1 to 5 C atoms, $R^2$ is a monovalent linear or branched hydrocarbon radical having 1 to 8 C atoms, $R^3$ is a divalent linear or branched hydrocarbon radical having 1 to 12 C atoms, which optionally contains cyclic and/or aromatic fractions and optionally one or more heteroatoms, and n is 0 or 1 or 2.

8. The composition as claimed in claim 1, wherein it has an amino- or mercaptosilane content in the range from 1 to 10 weight %.

9. The composition as claimed in claim 1, wherein the weight ratio between the liquid epoxy resin and the silane group-containing polymer is in the range from 1.2 to 10.

10. The composition as claimed in claim 1, wherein the relative amino- or mercaptosilane content based on the sum total of the silane group-containing polymer and the liquid epoxy resin is in the range from 2 to 10 weight %.

11. The composition as claimed in claim 1, wherein it comprises water or a water-releasing substance.

12. The composition as claimed in claim 11, wherein it comprises at least one water-releasing substance which is a compound condensable with primary amines.

13. A cured composition obtained from a composition as claimed in claim 1 by mixing of the first component with the second component.

14. A method comprising applying a composition as claimed in claim 1 as an adhesive.

15. An adhesively bonded article obtained from a method as claimed in claim 14.

16. The composition as claimed in claim 1, wherein the composition comprises at least one water-releasing substance that is a compound condensable with primary amines.

17. The composition as claimed in claim 16, wherein the at least one water-releasing substance that is a compound condensable with primary amines is at least one aldehyde, ketone, or diketone.

* * * * *